US010976191B2

(12) United States Patent
Bühlmeyer et al.

(10) Patent No.: US 10,976,191 B2
(45) Date of Patent: Apr. 13, 2021

(54) DEVICE COMPRISING A FLAT ELEMENT FOR LAYING ONTO A SHELF ELEMENT OF A GOODS RACK AND SYSTEM AND GOODS PRESENTATION SYSTEM HAVING SUCH A DEVICE

(71) Applicant: Rehau AG + Co., Rehau (DE)

(72) Inventors: Christian Bühlmeyer, Vienna (AT); Stefan Eibl, Hof (DE); Jörg Goldstein, Hof (DE); Peter Michels, Hof (DE); Ansgar Niehoff, Rehau (DE); Santiago Pardos, Selb (DE); Steven Schmidt, Döhlau (DE)

(73) Assignee: REHAU AG + CO., Rehau (DE)

( * ) Notice: Subject to any disclaimer, the term of this patent is extended or adjusted under 35 U.S.C. 154(b) by 7 days.

(21) Appl. No.: 16/467,962

(22) PCT Filed: Dec. 19, 2017

(86) PCT No.: PCT/EP2017/083565
§ 371 (c)(1),
(2) Date: Jun. 8, 2019

(87) PCT Pub. No.: WO2018/114962
PCT Pub. Date: Jun. 28, 2018

(65) Prior Publication Data
US 2020/0072659 A1    Mar. 5, 2020

(30) Foreign Application Priority Data
Dec. 20, 2016   (DE) .................. 102016124951.3

(51) Int. Cl.
A47B 96/02     (2006.01)
A47F 10/02     (2006.01)
(Continued)

(52) U.S. Cl.
CPC ....... *G01G 19/4144* (2013.01); *A47B 96/021* (2013.01); *A47F 10/02* (2013.01); *G01G 19/42* (2013.01); *A47F 2010/025* (2013.01)

(58) Field of Classification Search
CPC .... G01G 19/42; G01G 19/4144; A47F 10/02; A47F 2010/025; A47B 96/021; G06Q 10/087
(Continued)

(56) References Cited

U.S. PATENT DOCUMENTS

| 3,295,093 A | 12/1966 | Manfred et al. |
| 6,231,205 B1 | 5/2001 | Slesinger et al. |

(Continued)

FOREIGN PATENT DOCUMENTS

| DE | 20221024 | 2/2005 |
| DE | 202015105014 | 9/2015 |

(Continued)

OTHER PUBLICATIONS

Translation of Abstract of FR 2671471.
(Continued)

*Primary Examiner* — Jacques M Saint Surin
(74) *Attorney, Agent, or Firm* — Preston Smirman; Smirman IP Law, PLLC

(57) ABSTRACT

The invention relates to a device (300) comprising a flat element (302) made of a plastic material for arranging on a shelf surface (304) of a shelf element (306) for a goods rack (308) and comprising at least one signaling device (309) for signaling a weight load on at least one region of the flat element (302) caused by at least one good (305) arranged on the flat element. The invention further relates to a system (10) and to a goods presentation system (66) having such a device (300).

7 Claims, 6 Drawing Sheets

Figure 1:
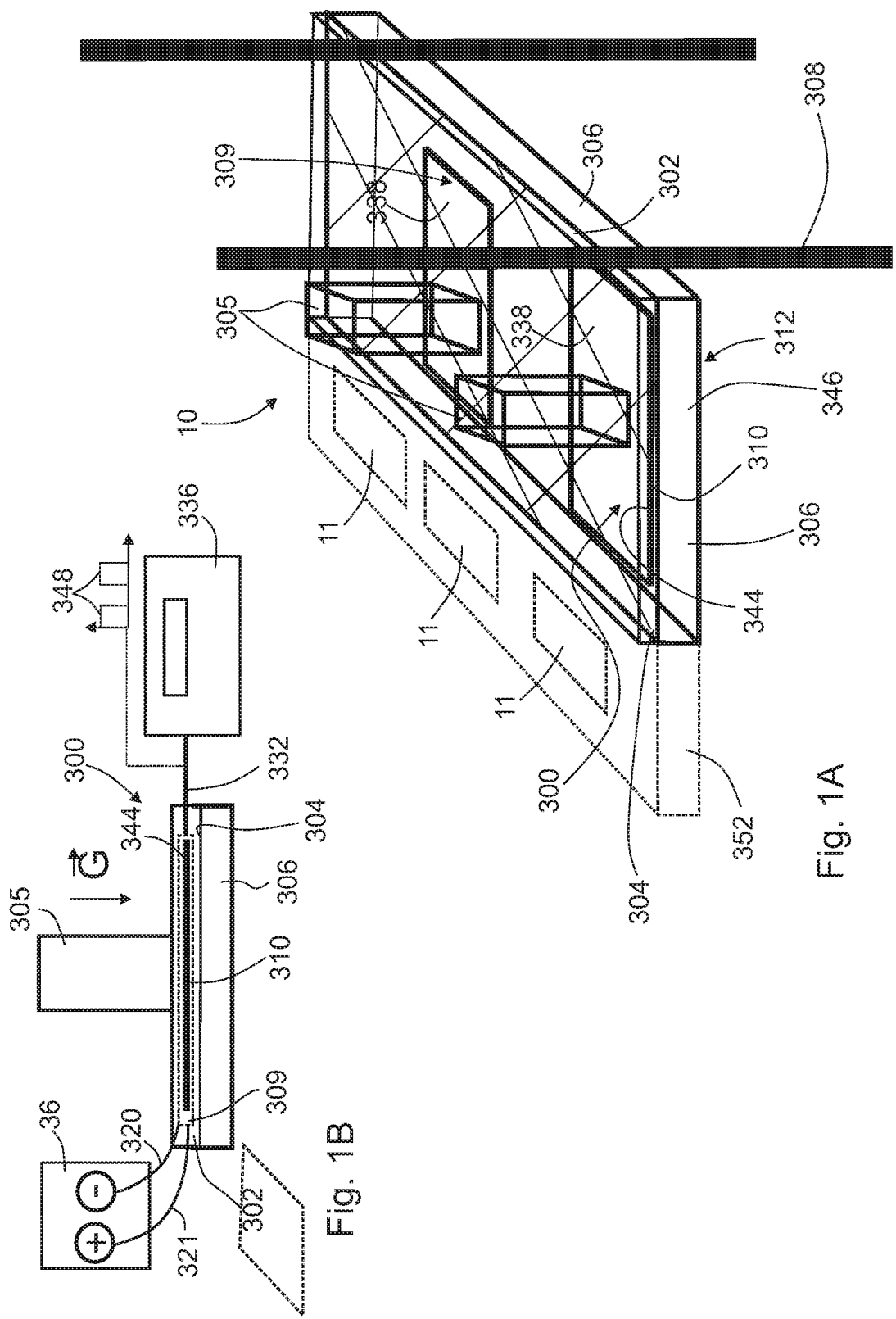

(51) Int. Cl.
*G01G 19/42* (2006.01)
*G01G 19/414* (2006.01)

(58) Field of Classification Search
USPC .......................................................... 177/132
See application file for complete search history.

(56) References Cited

U.S. PATENT DOCUMENTS

| | | | |
|---|---|---|---|
| 8,606,660 B2* | 12/2013 | Liang | G01G 23/3735 |
| | | | 705/28 |
| 8,915,609 B1 | 12/2014 | Shah et al. | |
| 10,001,402 B1* | 6/2018 | Gyori | G01G 21/22 |
| 10,064,502 B1* | 9/2018 | Gyori | H04W 4/80 |
| 2007/0069867 A1* | 3/2007 | Fleisch | G06Q 10/087 |
| | | | 340/309.16 |
| 2014/0055987 A1 | 2/2014 | Lindblom et al. | |
| 2014/0201041 A1 | 7/2014 | Meyer | |
| 2015/0041616 A1* | 2/2015 | Gentile | A47F 5/00 |
| | | | 248/550 |

FOREIGN PATENT DOCUMENTS

| | | |
|---|---|---|
| EP | 0558305 | 9/1993 |
| FR | 2671471 | 7/1992 |
| WO | 2005033645 | 4/2005 |
| WO | 2016205629 | 12/2016 |

OTHER PUBLICATIONS

Translation of Abstract of DE 202015105014.
International Search Report for PCT/EP2017/083565 dated Mar. 20, 2018.
Translation of International Search Report for PCT/EP2017/083565 dated Mar. 20, 2018.
Written Opinion of the International Searching Authority for PCT/EP2017/083565 dated Mar. 20, 2018.
Translation of Written Opinion of the International Searching Authority for PCT/EP2017/083565 dated Mar. 20, 2018.
International Preliminary Report on Patentability for PCT/EP2017/083565 dated Jun. 25, 2019.
International Search Report for PCT/EP2017/083550 dated Mar. 16, 2018.
Translation of International Search Report for PCT/EP2017/083550 dated Mar. 16, 2018.
Written Opinion of the International Searching Authority for PCT/EP2017/083550 dated Mar. 16, 2018.
Translation of Written Opinion of the International Searching Authority for PCT/EP2017/083550 dated Mar. 16, 2018.
International Preliminary Report on Patentability for PCT/EP2017/083550 dated Jun. 25, 2019.
International Search Report for PCT/EP2017/083462 dated Mar. 13, 2018.
Translation of International Search Report for PCT/EP2017/083462 dated Mar. 13, 2018.
Written Opinion of the International Searching Authority for PCT/EP2017/083462 dated Mar. 13, 2018.
Translation of Written Opinion of the International Searching Authority for PCT/EP2017/083462 dated Mar. 13, 2018.
International Preliminary Report on Patentability for PCT/EP2017/083462 dated Jun. 25, 2019.
"Panasonic NRF Big Show 2015 Panasonic Introduces Intelligent Retail Shelving Solution at NRF 2015 Powershelf Combines Live on Shelf Inventory Awareness, Mobile Phone Advertising, Dynamic Price Adjustments and More to Improve Profitability and Customer Satisfaction," Jan. 11, 2015, p. 1-4, XP055458103, Retrieved From the Internet: URL: https://www.businesswire.com/news/home/20150111005029/en/panasonic.
"Powershelf: Power at the Shelf," Feb. 2, 2015, p. 1-13, XP055458107, Retrieved From the Internet: URL:http://powershelf.net/wordpress/, Retrieved on Mar. 9, 2018.
Translation of Abstract of DE 20221024.

* cited by examiner

DEVICE COMPRISING A FLAT ELEMENT FOR LAYING ONTO A SHELF ELEMENT OF A GOODS RACK AND SYSTEM AND GOODS PRESENTATION SYSTEM HAVING SUCH A DEVICE

CROSS REFERENCE TO RELATED APPLICATION

The instant application is a National Stage of PCT International Patent Application Serial No. PCT/EP2017/083565 filed Dec. 19, 2017, which claims priority to German Patent Application Serial No. 102016124951.3 filed Dec. 20, 2016, the entire specifications of both of which are expressly incorporated herein by reference.

The present invention relates to a device comprising a flat element made of a plastic material and comprising a signaling device. The invention furthermore relates to a system and a goods presentation system comprising a device of this kind.

In the retail industry, in particular in supermarkets and chemist shops, it is conventional practice to use electronic or computer-based goods recording systems. As an essential input quantity, goods recording systems in particular process the existing stock, which generally has to be determined, for example in the context of an inventory, in a technically very complex and also usually very labor-intensive manner, by recording the goods arranged or placed on the shelfing devices or shelf bases of the goods shelves. Stock determined at different times is also an essential input quantity for determining the goods-related purchasing behavior of potential buyers or customers. Specifically, it is thus possible to ascertain, for example, the extent to which demand for particular goods changes over time. However, determining the purchasing behavior is very labor-intensive and technically very complex, in particular owing to the labor-intensive and technically very complex determination of the stock which is necessary therefor.

The object of the present invention is therefore that of specifying a device that can contribute to significantly reducing the effort for determining goods-related purchasing behavior.

This object is achieved according to the invention by a device having the features of claim 1.

The device according to the invention comprises a flat element that for example is made of a plastic material and that is intended to be arranged or placed on a shelf surface of a shelf element for a goods shelf or of a goods shelf, and at least one electrical signaling device or signaling device for signaling a weight load of at least one region of the flat element by goods arranged or placed on the flat element or from at least one goods item that is arranged or placed on a flat side of the flat element. The electrical signaling device or the signaling device, which is provided for signaling a weight load of at least one region of the flat element from at least one goods item that is arranged or placed on the flat element is thus an electrical signaling device or a signaling device for signaling a weight load of at least one region of the flat element from at least one goods item that is arranged on the flat element, or for signaling a weight load transmitted to at least one region of the flat element from at least one goods item that is arranged on the flat element.

In this case, the flat element can be arranged or placed on the shelf surface so as to form at least one instance of extensive contact between one of the two flat sides of the flat element and said shelf surface. As a flat element, this has a thickness or thickness extension that is smaller or substantially smaller than the length or the width of the flat element.

According to the invention, a device is provided that can advantageously contribute to significantly reducing the effort for determining goods-related purchasing behavior. The device according to the invention can thus advantageously be used for determining the purchasing behavior and/or can contribute to said determination, in that the flat element is arranged or placed on a shelf surface of a shelf element of a goods shelf of the relevant salesroom (such as a salesroom of a supermarket or a chemist shop), and subsequently one or more goods items to be offered for sale are placed or arranged on the flat element. Provided that the goods item or items is/are placed on a region in which the signaling device can signal a weight load from the goods item or items, the weight load of the flat element that is associated with the placement or arrangement is signaled by the signaling device, wherein the signaling of an existing weight load is particularly preferably achieved by means of a signal or electrical signal emitted by the signaling device, which signal thus provides information about the weight load. Said signal could typically be a signal that is generated or can be generated by a signal generation means of the signaling device, or a signal that is generated or can be generated by a signal generator of the signaling device. In a particularly practical manner, said signal or electrical signal could be in the form of a square-wave signal for example. Of course, the signal may in particular also be a digital signal that is generated by analogue-to-digital conversion, which signal can advantageously be further processed by means of a computer or a data processing means of a goods recording system of the supermarket, for example, or of the chemist shop, for example. The duration or durations of the time portion or time portions of a specified time period during which a signal characteristic of the weight load occurs or is present, can advantageously be consulted, in conjunction with the duration or durations of the time portion or time portions of the specified time period during which said signal is not present, as information or applicable information for determining the goods-related purchasing behavior. In particular, the durations of these time portions, following possibly necessary digitization of the durations, can advantageously be used in particular for computer-based determination of the goods-related purchasing behavior, by means of processes or methods that are routine practice for a person skilled in the art. The applicability of said time portions for the purchasing behavior results for example from the fact that, during the time portions having the signal or signals characteristic of the weight load, the goods item or the goods items is/are located on the flat element, and during the time portions in which the signal characteristic of the weight load is not present, goods are no longer present on the flat element because they have been removed by the customer for example.

Of course, the signaling device does not need to be configured to measure the value or the exact value of the relevant weight load. It is simply necessary for the signaling device to ascertain that a weight load is present, which is typically the case for example in the event of measuring a load that exceeds a load threshold, using a weight force measurement means of the signaling device.

Overall, the use of the device according to the invention or the use of a plurality of the devices according to the invention can contribute to significantly reducing the effort for determining goods-related purchasing behavior, compared with the known solutions, because the possibility provided of signaling the weight load of the flat element from the goods item or goods items allows for determination, in particular computer-assisted determination, of the goods-related purchasing behavior that does not require large numbers of staff or significant technical effort. For example, it is possible to conclude, from the signaling of a weight load by the signal characteristic of the weight load, and subsequent omission, for more than a minute, of the signal characteristic of the weight load, that in all probability the goods will also be purchased by the customer. If the signal characteristic of the weight load appears again sooner, it is possible to conclude that in all probability the customer has replaced the goods and is not interested in purchasing them.

On the basis of what has been set out above, it is also clear that the device according to the invention can in particular also be advantageously used for determining the stock of the goods item or goods items stored on the flat element, and specifically, owing to what has been set out above, the stock take can be achieved with significantly less effort than in the known solutions, and in particular the number of staff required for determining the stock can be reduced by means of the device according to the invention. In this respect, the device according to the invention also achieves the object of significantly reducing the effort for determining stock of a goods shelf. The invention therefore also relates in particular to the use of the device according to the invention for determining stock of a goods shelf.

According to the invention, the device can in particular also comprise a plurality of signaling devices, wherein each of the signaling devices preferably signals or can signal a weight load of a region, assigned thereto, of the flat element from at least one goods item. In this way, it is possible to monitor the purchasing behavior and/or the stock for a plurality of goods stored on the relevant shelf element, for each shelf element. In a particularly practical manner, provided that the signaling devices are designed for emitting signals which are emitted or generated by the relevant signaling devices and are processed by a computer, following analogue-to-digital conversion, which may be required, the stock or the purchasing behavior can be shown or displayed in a manner well-known to a person skilled in the art, via a display device connected to the computer, for example a large central display in a management office of a department store, on the basis of the signals or data transmitted to said computer.

It is particularly practical for the signaling device or the relevant signaling device to comprise a notification means and to be designed to actuate the notification means for the purpose of providing a notification of the weight load or the lack of a weight load, in the case of the presence or absence of an existing weight load of the flat element from at least one goods item. The notification could be achieved for example by illumination of an illumination means of the notification means.

The signaling device for signaling a weight load of at least one region of the flat element from at least one goods item arranged on the flat element particularly preferably comprises at least one force sensor for measuring the weight load that is arranged on or applied to the flat element.

The force sensor is a force sensor for measurement or for electrical measurement of a weight force acting on the flat element, or for measurement or electrical measurement of a weight load of the force sensor, wherein the measuring surface of the force sensor over which the weight force to be measured is to be introduced into the flat element for the measurement thereof, or over which the weight force to be measured is to be transmitted to the force sensor, is arranged with respect to the flat element such that a weight load of the flat element from one or more goods can be measured by the force sensor. This means that the measuring surface of the force sensor is particularly preferably arranged so as to be in parallel with, or is particularly preferably arranged so as to be substantially in parallel with one of the two flat sides of the flat element. The force sensor can in particular be attached to the flat element such that the measuring surface of the force sensor is located over the flat element or between the flat element and the shelf surface of the shelf element in the state in which the flat element is placed on the shelf surface of the shelf element. Particularly preferably, the signaling device can also be embedded in the plastic material of the flat element in part, such that the measuring surface of the force sensor is embedded in the plastic material of the flat element or such that the measuring surface of the force sensor is received in the plastic material, wherein the plastic material particularly preferably consists of a thermoplastic, such as polypropylene or polyethylene, in order for it to be possible to achieve effective force transmission of the weight force through the plastic material of the flat element and to the measuring surface of the force sensor. The force sensor may be a force sensor that is well-known to a person skilled in the art. This may thus for example be a force sensor comprising strain gauge strips or for example a piezo force sensor or a piezoelectric force sensor, or for example a resistive force sensor.

As already set out above, the signaling of an existing weight load of the flat element can particularly preferably be achieved by means of a signal that is emitted by the signaling device, which signal thus provides information about the weight load. This signal could typically be a signal that is generated or can be generated by a signal generation means of the signaling device, or a signal that is generated or can be generated by a signal generator of the signaling device, wherein the signal generation means or the signal generator preferably generates or forms said signal from the measuring signal emitted by the force sensor, or generates or forms said signal on the basis of the measuring signal emitted by the force sensor. In a particularly practical manner, said electrical signal could be in the form of a square-wave signal for example, which may be able to be generated by the signal generation means for example in the event of the measuring signal of the force sensor exceeding or failing to reach a signal threshold value.

The signaling device is a signaling device for signaling a weight load of at least one region of the flat element from at least one goods item arranged on the flat element. The signaling device may particularly advantageously be a signaling device that is designed to signal a weight force which is transmitted to the flat element from at least one goods item, over any desired sub-surface of one of the flat sides of the flat element. This can be achieved in a particularly practical manner in that the signaling device comprises a force sensor for measuring the weight load, which force sensor has a measuring surface that corresponds to the surface area of the flat side, or is larger than said surface area.

The shelf surface of the shelf element is a shelf surface for storing or arranging at least one goods item, on which surface, according to the invention, instead of the goods item or good items the flat element is to be placed or placed in an extensive manner. For the purpose of determining the goods-related purchasing behavior or the goods-related stock level, the at least one goods item is in turn to be placed or arranged on the flat element.

In a particularly preferred embodiment of the device according to the invention, the flat element is elongate, and the device comprises a plurality of signaling devices that each comprises a force sensor, wherein the measuring surfaces of the signaling devices are particularly preferably arranged in succession, in rows, in the longitudinal direction of the flat element. Arranging the force sensors in rows advantageously achieves a possibility for signaling existing weight loads of stored goods over the entire length of the flat element. In particular, the arrangement in rows means that one signaling device can be provided for one portion, respectively, of the flat element, and it is therefore possible for each signaling device to be provided for or to signal a weight load for at least one goods item that may be arranged on the relevant portion. Overall, this arrangement advantageously makes it possible to achieve goods-specific signaling of the weight loads for a large number of goods, without significant effort.

The above object according to the invention, or the above objects according to the invention, is/are also achieved by a system comprising at least one device according to the invention, at least one shelfing device for a goods shelf, and a power supply system for supplying power to a plurality of electronic display devices for displaying goods-related information, wherein the shelfing device comprises a shelf element having a shelf surface on which the flat element can be placed, wherein the power supply system comprises an elongate base body that is made of a plastic material and can be attached to the shelfing device, and at least one closure means, wherein the base body comprises a channel that extends over the entire length of the base body and is intended for receiving the display devices, wherein the base body comprises two opposite end portions, wherein each of the end portions comprises one of two opposite channel end portions of the channel, wherein the display devices can be received in the channel, wherein the power supply system comprises at least two electrical conductors, wherein each of the electrical conductors comprises two electrical conductor end portions and an intermediate portion, wherein the intermediate portion of each electrical conductor is arranged in the channel, and in each case one of the electrical conductor end portions of each electrical conductor is arranged in one of the two opposite channel end portions, respectively, by means of at least one sub-portion, wherein receiving the display devices in the channel means that in each case one power supply contact of each display device can be electrically conductively contacted with one of the electrical conductors, respectively, wherein the closure means comprises at least two electrical supply lines which are provided for establishing a connection to a current source, wherein the closure means can be connected to at least one of the two opposite end portions of the base body, wherein connecting the closure means to the end portion of the base body makes it possible for one supply line end portion of each of the supply lines to be electrically conductively contacted, in each case, with one electrical conductor end portion, respectively, of the electrical conductor end portions which are arranged in the channel end portion of the end portion of the base body by means of at least one sub-portion, i.e. the end portion of the base body to which the closure means is or is intended to be connected.

The elongate base body made of a plastic material is particularly preferably an extruded base body or a base body that is manufactured by means of extrusion. Base bodies of this kind can be manufactured in large numbers and at a high and consistent level of quality. Thermoplastic polymer materials, such as polypropylene or polyethylene, are suitable as a material for this.

The elongate base body that is made of a plastic material and is intended to be attached to the shelfing device for the goods shelf or of the goods shelf is therefore an elongate base body that is provided for attachment to the shelfing device or which can be attached to the shelfing device or can be connected to said shelfing device. In this case, the shelfing device may in particular comprise a shelf base of a goods shelf or for a goods shelf, or be designed in the form of a shelf base of a goods shelf or for a goods shelf. For the purpose of retaining the base body on the shelfing device, the base body may for example comprise at least one region that can be received in the receptacle provided on the shelfing device. The at least one region may for example also be a hook-shaped region which can be suspended in a receptacle that is provided on the shelfing device.

The power supply system according to the invention for supplying power to a plurality of display devices for displaying goods-related information comprises the elongate base body made of a plastic material, and at least one closure means. The base body, which is preferably an extruded base body or a base body that is manufactured by means of extrusion, comprises a channel that extends over the entire length of the base body and is intended for receiving the display devices, or the base body comprises an elongate receptacle that extends over the entire length of the base body and is intended for receiving the display devices.

The channel or the receptacle extends over the entire length of the base body, or the channel or the receptacle extends from one of two opposite ends of the base body to the other of the two opposite ends of the base body.

The base body comprises two opposite end portions or the base body comprises two end portions that are arranged so as to be longitudinally mutually opposite, wherein each of the end portions of the base body comprises one, or one in each case of two, opposite channel end portions of the channel, or one, or one in each case of two, longitudinally mutually opposite channel end portions of the channel (or comprises one of two opposite receptacle end portions of the receptacle or one of two longitudinally mutually opposite receptacle end portions of the receptacle), or wherein a channel end portion or a receptacle end portion is arranged in each case at one of two opposite, or longitudinally mutually opposite, end portions of the base body.

The display devices can be received in the channel, wherein the display devices can preferably be received in the channel so as to be in succession along the longitudinal axis of the base body, in order to form a row of successive display devices, or can be received in the channel in a manner forming a row that extends along the longitudinal axis of the base body, or can be received in succession. This arrangement in rows advantageously makes it possible to arrange the power supply system in the surroundings of a goods shelf, in which one display device, respectively, can be directly assigned to the associated goods item, by the potential purchaser or prospective customer, and specifically to the goods items from a plurality of goods items which are likewise placed or arranged successively, in rows, on the shelfing device or on a shelf base of a goods shelf.

The channel of the base body, which is intended or designed for receiving the display devices, extends over the entire length of the base body. The channel is particularly preferably a channel that is oriented so as to be in parallel with the longitudinal axis of the base body, or the channel is particularly preferably an elongate channel that is oriented so as to be in parallel with the longitudinal axis of the base body. Insofar as the base body is preferably an extruded base body, the channel is a channel that is formed during extrusion of the base body. As a result of extending over the entire length of the base body, the channel or the receptacle is open or accessible at both end faces of the base body. The channel is particularly preferably also open or accessible at a longitudinal side of the base body, such that the display devices can be received in the channel from the longitudinal side. This is advantageous in that it is not necessary to push the display devices into the channel in succession, by the end faces thereof, in order to achieve a row of display devices that are arranged in succession on the base body, which may be difficult, depending on the design of the channel, owing to canting.

The or each of the display devices can be received in the channel, wherein the or each display device can be received in the channel in particular in a force-fitting manner. In a particularly practical manner, the or each display device can form a releasable snap connection to the extruded base body, by means of being received in the channel.

The power supply system comprises at least two electrical conductors that are arranged in the channel, wherein each of the electrical conductors comprises two electrical conductor end portions and an intermediate portion, wherein the intermediate portion of each electrical conductor is arranged in the channel, and in each case one of the electrical conductor end portions of each electrical conductor is arranged in one of the two opposite channel end portions, respectively, by means of at least one sub-portion.

The mutually spaced electrical conductors may be electrical conductors of a design that is well-known to a person skilled in the art. The electrical conductors may thus be designed for example in particular in the form of conductor tracks, wherein the conductor tracks may for example be conductor tracks made of copper, of copper-plated aluminum, or of galvanized aluminum, or of copper-plated gold, or of silver, or of graphite, or of conductive polymers (such as PEDOT-PSS, PANI, etc.), or of various carbon modifications (such as CNTs, fullerenes, etc.). In order to be retained in the channel, the conductor tracks may be extruded or mounted or printed on the plastic material of the base body for example, or, in order to be retained in the channel, each of the conductor tracks may be designed in the form of an elongate segment of an elongate conductive body, wherein a further segment of the elongate conductive body may for example be extruded, printed, adhesively bonded or clipped into the plastic material of the base body.

The system according to the invention is characterized firstly in that by receiving the display devices in the channel means, in each case one power supply contact of each display device can be electrically conductively contacted with one of the electrical conductors, respectively. It is thus advantageously possible, in a simple and practical manner, to achieve contacting, required for the supply of power to the display devices, of the electrical conductor arranged in the channel to the power supply contacts or voltage supply contacts of the display devices, or the power supply connections or the voltage supply connections of the display devices, for each of the display devices that are intended to be arranged in the channel and are intended for displaying goods-related information.

The system according to the invention is furthermore characterized in that the closure means or the at least one closure means comprises at least two electrical supply lines which are provided for establishing a connection to a current source or which are provided for attachment to a current source, wherein the closure means can be connected to at least one of the two opposite end portions of the base body, and wherein connecting the closure means to the end portion of the base body makes it possible for one end portion of a supply line (or supply line end portion) of each of the supply lines to be electrically conductively contacted, in each case, with one electrical conductor end portion, respectively, of the electrical conductor end portions which are arranged in the channel end portion of the end portion of the base body by means of at least one sub-portion.

The contactability, provided according to the invention, of the power supply contacts of each of the display devices with the electrical conductors that are arranged in the channel, by means of receiving the display devices in the channel, together with the electrical contacting of the supply line end portions of the display device with the electrical conductor end portions of the electrical conductors that can be achieved by simple connection of the display device to the end portion, advantageously allows for provision of the power supply or voltage supply of the display devices that can be achieved in a very simple and practical manner, via the electrical supply lines of the closure means which are provided for establishing a connection to a current source or to an external current source or which are provided for establishing an electrically conductive connection to a current source or to an external current source or to a voltage source or to an external voltage source. The power supply for all the display devices can thus be achieved in a simple manner, in that the display devices are received in the channel, the closure means is connected to the end portion of the base body, thereafter the supply lines of the closure means are connected to a current source or electrically conductive connections of the supply lines to a current source are established, and the display devices are supplied with power or are supplied with a supply voltage from the current source via the supply lines, wherein this can be achieved for example in the case of a direct current source in that one of the supply lines is connected to the positive pole of the current source and the other of the two supply lines is connected to the negative pole of the current source. Overall, the power supply of the display devices, which can be achieved in a very simple manner by means of the system or power supply system according to the invention, means that the amount of cabling for providing the power supply can be reduced or significantly reduced. Once the display devices have been received in the channel, it is merely necessary to connect the supply lines to the relevant current source or voltage source. Complex cabling of each individual display device, as is the case in known solutions, can advantageously be omitted. It is thus possible to significantly reduce the installation complexity, and thus in particular also the installation costs.

The display devices for displaying goods-related information or product-related information may be conventional or known display devices or electronic display devices which are provided or designed for displaying goods-related information or product-related information, and which typically comprise an electronic display. In particular, these may be display devices comprising an electronic display, which devices are designed in the form of what are known as ESLs (electronic shelf labels), also referred to as electronic price tags. In terms of scale, said display devices may have a length within a range of from 2 to 125 cm, a height within a range of from 2 to 50 cm, and a thickness within a range of from 0.2 to 2 cm.

The goods-related information may be any desired information relating to the relevant goods, e.g. the price of the goods, the designation of the goods, the sell-by date, the weight, etc.

In the case of the power supply system according to the invention, each of the electrical conductors comprises two electrical conductor end portions, one of which is arranged, in each case, in one of the two opposite channel end portions, by means of at least one sub-portion. That is to say, therefore, that in the case of one of the electrical conductors a first of the two electrical conductor end portions is arranged in a first of the two opposite channel end portions, by means of at least one sub-portion, and the second electrical conductor end portion of said electrical conductor is arranged in the second of the two opposite channel end portions, by means of at least one sub-portion. An intermediate portion of the relevant electrical conductor, which intermediate portion extends from the first electrical conductor end portion as far as the second electrical conductor end portion or connects the first electrical conductor end portion to the second electrical conductor end portion is then arranged in a central region of the channel which reaches from the first channel end portion as far as the second channel end portion. Each of the electrical conductors particularly preferably extends over the entire length of the base body. Furthermore, each of the electrical conductors is particularly preferably designed so as to be straight, and particularly preferably extends so as to be in parallel with or substantially in parallel with the longitudinal axis of the extruded base body. This is not essential, however. According to the invention, all that needs to be ensured is that receiving the display devices in the channel means that in each case one of the power supply contacts of each display device can be electrically conductively contacted with one of the electrical conductors, respectively. The contactability can be achieved in a manner well-known to a person skilled in the art, in particular by means of suitable adaptation of the dimensions of the channel to the relevant dimensions of the display device or display devices.

The closure means comprises at least two electrical supply lines which are provided for establishing a connection to a current source or for attachment to a current source. Of course, the supply lines may in particular be current-carrying conductors or internal conductors or cores of a supply line, at least in portions, particularly preferably current-carrying conductors or internal conductors of one single supply line.

Of course, each of the electrical conductor end portions may for example also be designed in the form of a current-conducting contact of a plug or mating plug. Of course, it is in addition possible for each of the supply line end portions to also be designed in the form of a current-conducting contact of a corresponding mating plug or plug, such that it may be possible to also form plug connections, by means of connecting the closure means to the end portion of the base body, in order to achieve the electrically conductive contacting or the electrically conductive connection between the supply line end portions and the electrical conductor end portions.

The closure means can be connected to at least one of the two opposite end portions of the base body, wherein the closure means can particularly preferably be connected to the end portion of the base body in a force-fitting manner. In particular, the closure means can preferably comprise a plug-in member which can be plugged, by means of the end face thereof, into the channel of the extruded base body, in order to establish a force-fitting connection to the extruded base body.

Particularly preferably, the closure means can be detachably connected or connected in a manually detachable manner to at least one of the two opposite end portions of the base body, such that the closure means can advantageously be detached from the preferably extruded base body, in particular for maintenance purposes or repair purposes, and optionally also reconnected to said base body.

Connecting the closure means to the end portion of the base body makes it possible for one or supply line end portion of each of the supply lines to be electrically conductively contacted, in each case, with one electrical conductor end portion, respectively, of the electrical conductor end portions which are arranged in the channel end portion of the end portion by means of at least one sub-portion. Said contactability can be achieved in a manner well-known to a person skilled in the art, in particular by means of a suitable arrangement of the supply line end portions. It is thus possible, for example, for each of the supply line end portions to in particular protrude into the channel of the base body, when a connection exists between the base body and the closure means, in order to achieve the contacting to the electrical conductor end portions which are in each case arranged in the channel by means of at least one sub-portion.

Each electrical conductor comprises two electrical conductor end portions, one of which is arranged, in each case, in one of the two opposite channel end portions, by means of at least one sub-portion. The relevant electrical conductor end portion is thus arranged in one of the two opposite channel end portions, by means of at least one sub-portion, such that the relevant electrical conductor end portion can thus in particular also be arranged fully or entirely in the relevant channel end portion or can be arranged in the channel, in particular without protruding out of the channel end portion. According to the invention it may, however, also be possible for just one sub-portion of the relevant electrical conductor end portion to be arranged in the channel end portion, such that a further sub-portion of the relevant electrical conductor end portion can thus in particular also be arranged outside the relevant channel end portion or can protrude out of the relevant channel end portion.

In the case of the system according to the invention, the above-described advantageous device according to the invention is combined with the above-described advantageous power supply system for supplying power to the display devices, such that, overall, provision of the current supply or of the voltage supply of the display devices that can be achieved in a very simple and practical manner is advantageously possible, in conjunction with a device that can advantageously contribute to significantly reducing the outlay for determining goods-related purchasing behavior or a stock level.

In a preferred embodiment of the system according to the invention, the base body comprises a further channel that extends over the entire length of the base body, wherein a busbar comprising at least two electrical busbar conductors, which extend in the longitudinal direction of the busbar, is arranged in at least one portion of the further channel, wherein the signaling device comprises at least two power supply conductors for supplying power to the signaling device, wherein one end portion, in each case, of each of the power supply conductors can be connected to one of the busbar conductors, respectively, wherein the further channel is open towards a longitudinal side of the base body, such that the end portions of the power supply conductors can be connected to the busbar conductors from outside the further channel, wherein the closure means comprises at least two further electrical supply lines which are provided for establishing a connection to a current source, wherein connecting the closure means to the end portion of the base body or to one of the two end portions of the base body, respectively, makes it possible for one supply line end portion of each of the further supply lines to be electrically conductively contacted, in each case, to one busbar conductor, respectively, of the busbars, or to one end portion, respectively, of the busbar conductor.

In this preferred embodiment of the system according to the invention, following connection of the power supply conductor of the device according to the invention to the relevant busbar conductor by means of easily achievable connection of the closure means to an end portion of the base body, in order to supply power to the signaling device, electrically conductive connections to the further supply lines of the closure means can be established, which connections are in turn provided for establishing a connection to a current source.

The further or second channel is particularly advantageously open towards a longitudinal side of the base body, such that the end portions of the power supply conductors of the signaling device(s) can be connected to the busbar conductors from outside the further channel. It is advantageous in particular for a plurality of signaling devices to be provided, since the relevant end portions of the power supply conductors of the signaling devices can then advantageously be connected to the busbar conductors from the longitudinal side, so as to be in succession along the busbar, with the result that it is advantageously possible in particular for very tidy cabling to be achieved, which may in particular also be advantageous from a safety perspective. The possibility of connection in succession along the busbar may be advantageous in particular in the case of a plurality of signaling devices each comprising one force sensor, which signaling devices are intended to be arranged such that the relevant force sensor measuring surfaces thereof are also in succession along the longitudinal axis of the flat element.

In a further preferred embodiment of the system according to the invention, the busbar may also comprise, or additionally comprise, at least one signal conductor which extends in the longitudinal direction of the busbar and is intended for forwarding signals, wherein the signaling device (as well) comprises at least one signal conductor for forwarding signals or measuring signals of the signaling device, wherein the signal conductor of the signaling device can be connected to the signal conductor of the busbar, wherein the closure means, as well as the electrical supply lines, comprises at least one signal transmission line that is intended for transmitting measuring signals of the signaling device to a measuring signal processing means, wherein connecting the closure means to the end portion of the base body of the signal conductor makes it possible for the busbar to be connected to the signal transmission line in a signal-transmitting manner.

This preferred embodiment makes it possible for a signal-transmitting connection between the signal conductor(s) of the signaling device(s) and the signal transmission line(s) of the closure means to be established following additional connection of the signal conductor or signal conductor of the signaling device or signaling devices to the signal conductor of the busbar, and subsequent connection of the closure means to the relevant end portion of the base body. A signal-transmitting connection to a measuring signal processing means or signal processing means can thus be established by means of the signal transmission line(s) of the closure means, which processing means is designed or intended for processing measuring signals or signal transmission line for signaling the presence of a weight load of the flat element.

In order to achieve the greatest possible number of terminal connections, the busbar can particularly advantageously extend over the entire length of the base body of the power supply system.

In a preferred embodiment of the system according to the invention, the closure means comprises a flat body made of a plastic material and comprising two opposite sides, and at least two plug-in members that are connected to one of the two sides and are made of a plastic material, wherein one of the plug-in members is intended to be plugged into the channel for receiving the display devices, wherein a further plug-in member is intended to be plugged into the channel in which the busbar is arranged, wherein, in order to connect the closure means to the end portion of the base body, each plug-in member can be received in the relevant channel in a force-fitting manner by means of being plugged into the relevant channel by an end face.

This closure means makes it possible to achieve a connection of the supply line end portions to the electrical conductor end portions and/or of the signal transmission line to the signal conductor of the busbar in a very simple and practical manner, by means of a simple plug-in procedure. Providing the flat body advantageously allows for a weight-saving and visually appealing design of the flat body. In order to connect the closure means to the end portion of the base body, the plug-in members can be received in the relevant channel, or can be received in the relevant channel entirely or at least in part, in a force-fitting manner by means of being plugged into said relevant channel by an end face, or, in order to connect the closure means to the end portion of the base body, each plug-in member can be retained in the relevant channel particularly preferably in a clamped manner or can be retained in the relevant channel so as to form a clamping tension. Of course, the connection between the closure means and the base body, which connection can be achieved by means of this preferred embodiment, can particularly preferably be a detachable or manually detachable connection. It is thus particularly preferable for each of the plug-in members to be able to be pulled out of the relevant channel or manually pulled out of the relevant channel. The detachability, which is preferably provided, of the connection between the closure means and the base body advantageously makes it possible in particular for maintenance work or repairs to be performed in a simple and practical manner.

The plastic material from which the flat body and each of the plug-in members consists may for example be thermoplastics polymers, thermosetting plastics and elastomers. Preferred thermoplastics polymers are: PVC, ABS, ASA, PET, PC, PS, PA, as well as all plastic materials from the group of the polyolefins, the polyacrylates, polycarbonates and polyester.

The supply line end portions, which can be contacted with the electrical conductor end portions of the electrical conductors in order to supply the display devices, are particularly preferably provided on the plug-in member for being plugged into the channel for receiving the display devices. Since the plug-in member can be received in the channel in a force-fitting manner, by means of being plugged in, providing the supply line end portions on the plug-in member advantageously also makes it possible to achieve stable electrically conductive contacting of the supply line end portions with the electrical conductor end portions. Accordingly, the further supply line end portions which can each be electrically conductively contacted with one busbar conductor, respectively, are also particularly preferably provided on the further plug-in member, in order that the stable electrically conductive contacting can advantageously be achieved.

The end face of the base body can particularly preferably be covered by the flat element by means of the end faces of the plug-in members being plugged into the channels. The possibility of covering that is provided thereby makes it possible to achieve visually very appealing termination. In particular, the flat element may be of a design that advantageously allows for flush connection to the base body by means of plugging the plug-in member into the channel by the end face thereof, which flush connection is associated with the creation of visually very appealing termination.

The elongate base body of the power supply system is advantageously an extruded base body made of a plastic material, i.e. a base body that is manufactured by means of extrusion. By means of extrusion, a plurality of base bodies can be manufactured at a consistently high quality, within the context of automated manufacturing. The plastic material from which the base body consists may for example be thermoplastics polymers, thermosetting plastics and elastomers. Preferred thermoplastics polymers are: PVC, ABS, ASA, PET, PC, PS, PA, as well as all plastic materials from the group of the polyolefins, the polyacrylates, polycarbonates and polyester.

The invention also relates to a goods presentation system comprising at least one system according to the invention, described above, and at least one goods shelf comprising at least two retaining posts, wherein the base body of the power supply system can be attached to the shelfing device, wherein the shelfing device comprises the shelf element comprising the shelf surface and two retaining elements, wherein the retaining elements are connected to the shelf element, wherein each retaining post comprises at least one receptacle in which one of the retaining elements can be received, in each case, for retaining the shelfing device on the retaining posts, wherein at least one of the retaining posts comprises at least two electrical conductors which are provided for connection to a current source, wherein at least one of the retaining elements comprises at least two electrical connection elements, wherein one of the supply lines of the closure means in each case can be connected to each connection element, wherein each connection element can be electrically conductively contacted with one of the conductors, respectively, of the retaining post, by means of the retaining element being received in the receptacle of the retaining post.

The goods presentation system according to the invention is characterized in that it combines the advantages of the above system according to the invention with at least one goods shelf comprising at least two retaining posts. The retaining posts and the at least one shelfing device of the goods shelf are characterized in that, after the supply lines of the closure means have been connected to the connection elements by receiving the retaining elements in the receptacles of the retaining posts, in an easily achievable manner, specifically in order to retain or attach the shelfing device on the retaining posts, and subsequent attachment of the conductor of the retaining post to a current source, the electrical conductors of the retaining posts and the electrical connection elements of the retaining elements allow for electrically conductive connections of the supply lines of the closure means to the current source to be established, specifically in order to supply power or to supply voltage to electronic display devices received in the channel of the base body of the power supply system according to the invention, and/or in order to supply power or to supply voltage to the signaling device(s) which can be supplied with power via the busbars.

Each retaining post comprises at least one receptacle or a plurality of receptacles, in which one of the retaining elements can be received, in each case, for retaining the shelfing device on the retaining posts. In particular, each of the retaining elements may comprise an end region that can be suspended in the relevant receptacle, wherein the electrical connection elements may be provided at the end region. In particular, the conductors of the retaining posts may be arranged in a longitudinal channel of the retaining post or of the relevant retaining post, wherein, in the state in which the end region is suspended, electrically conductive contact to the relevant electrical conductor of the retaining post exists for each connection element.

The elongate base body of the system according to the invention system can be attached to the shelfing device or connected to the shelfing device. In particular, in the case of an elongate shelfing device, it may particularly preferably be possible for the elongate base body of the power supply system to be attached to the shelfing device in an arrangement in which a surface of the base body that extends along the longitudinal axis of the base body faces a surface of the shelf element that extends along the longitudinal axis of the shelf element. Or, in other words: In particular, in the case of an elongate shelfing device, it may particularly preferably be possible for the elongate base body of the power supply system to be attached to the shelfing device such that a surface of the base body that extends along the longitudinal axis of the base body faces a surface of the shelf element that extends along the longitudinal axis of the shelf element. In this arrangement in which the channels of the base body of the power supply system particularly preferably extend so as to be in parallel with the longitudinal axis of the shelf element or of the shelfing device, the purchasers or potential purchasers can advantageously establish a direct connection to the display device that is provided for the goods item in question.

It is particularly practical for the retaining elements to be preferably detachably connected to the shelf element.

In a preferred embodiment of the goods presentation system according to the invention, said system comprises a system as described above, comprising the signal conductors, wherein at least one of the retaining posts comprises at least one signal line that is intended for transmitting signals of the signaling device to a signal processing means, wherein at least one of the retaining elements comprises a signal line connection, wherein the signal transmission line of the closure means can be connected to the signal line connection, wherein the signal line connection can be connected to the signal line of the retaining post in a signal-transmitting manner by means of the retaining element being received in the receptacle of the retaining post.

In said preferred embodiment, it is advantageously additionally possible for transmission of signals of the signaling device to the signal processing means to be achieved by simple connection of the signal transmission line of the closure means to the signal line connection, receiving of the retaining elements in the receptacles of the retaining posts, and signal-transmitting connection of the signal line of the retaining post to a signal processing means, in order to process said signals, for example for determining the purchasing behavior, or for example for determining the stock level.

Figure 2:
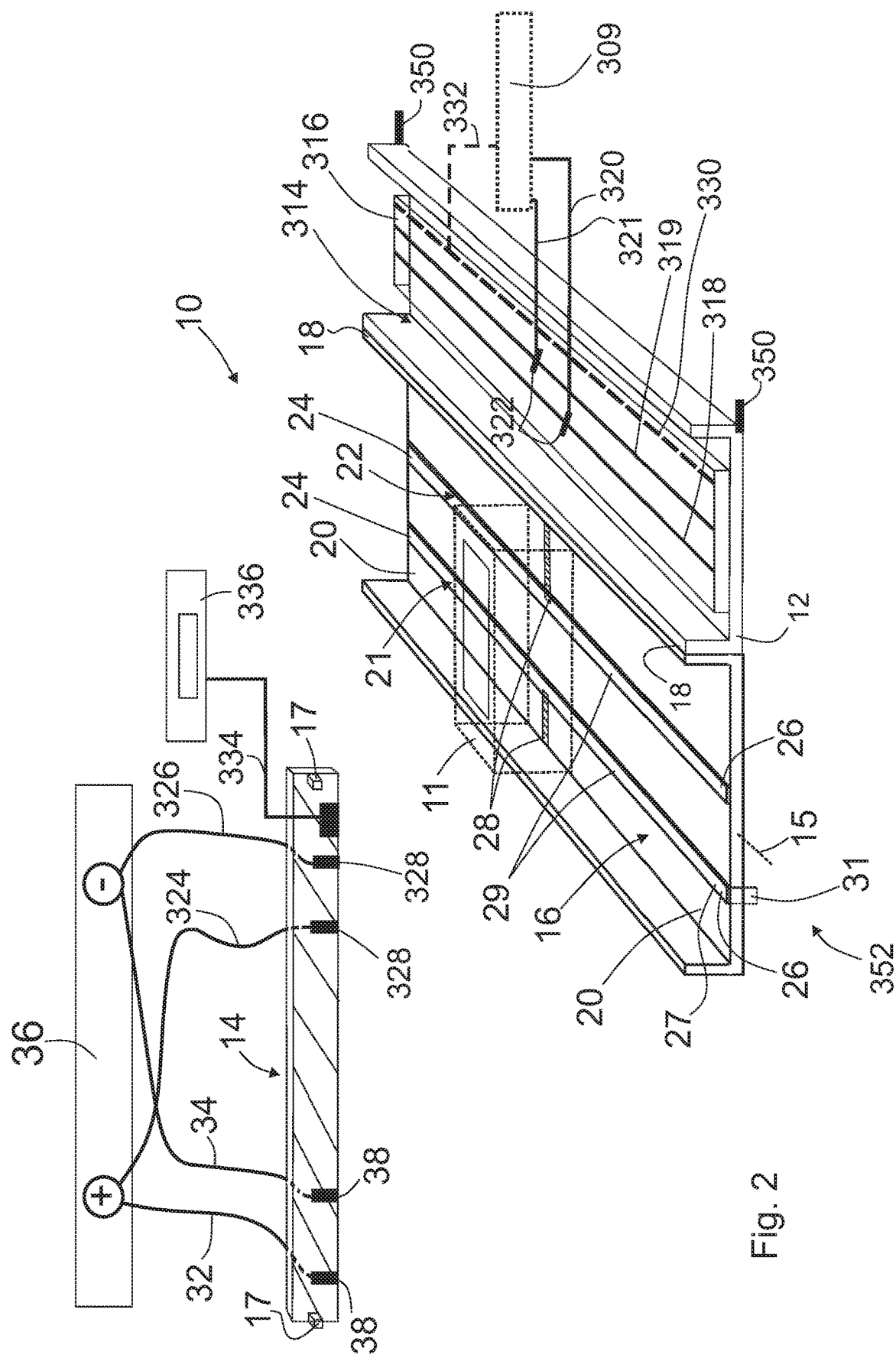
Figure 3:
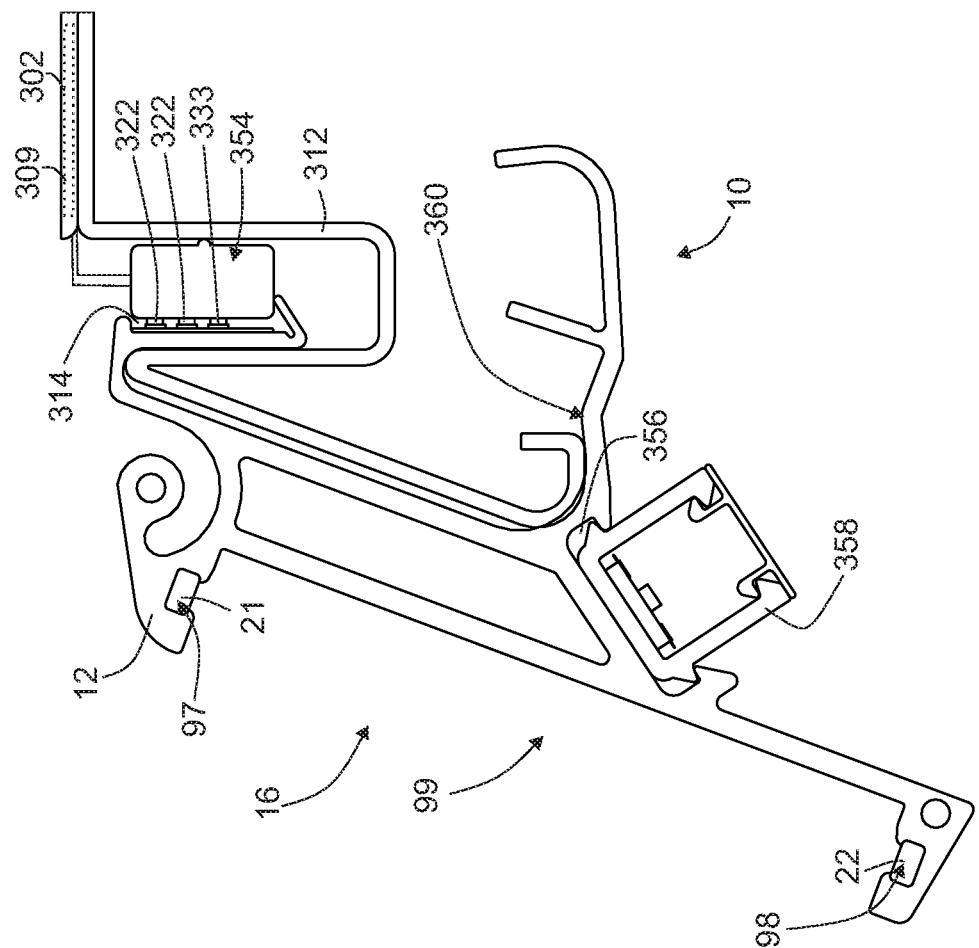
Figure 4:
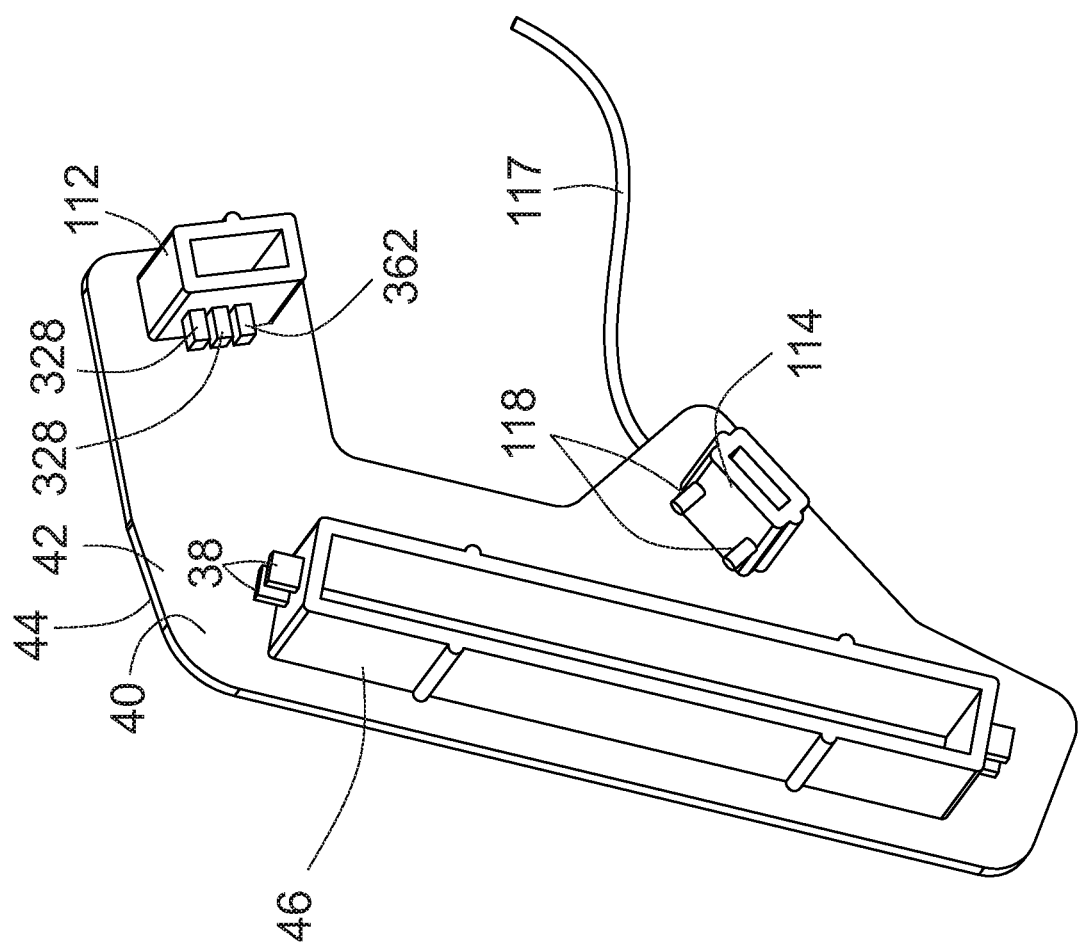
Figure 5:
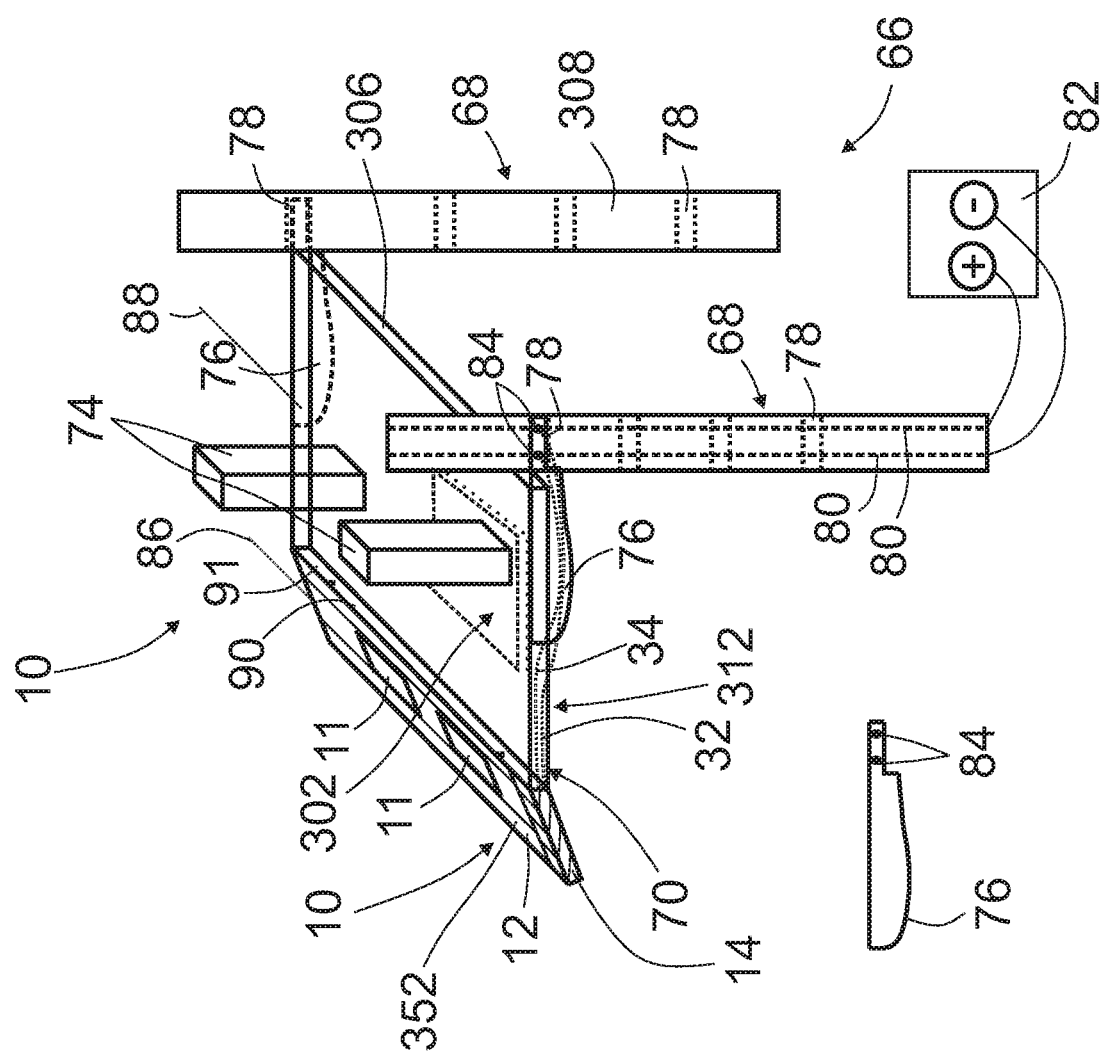
Figure 6:
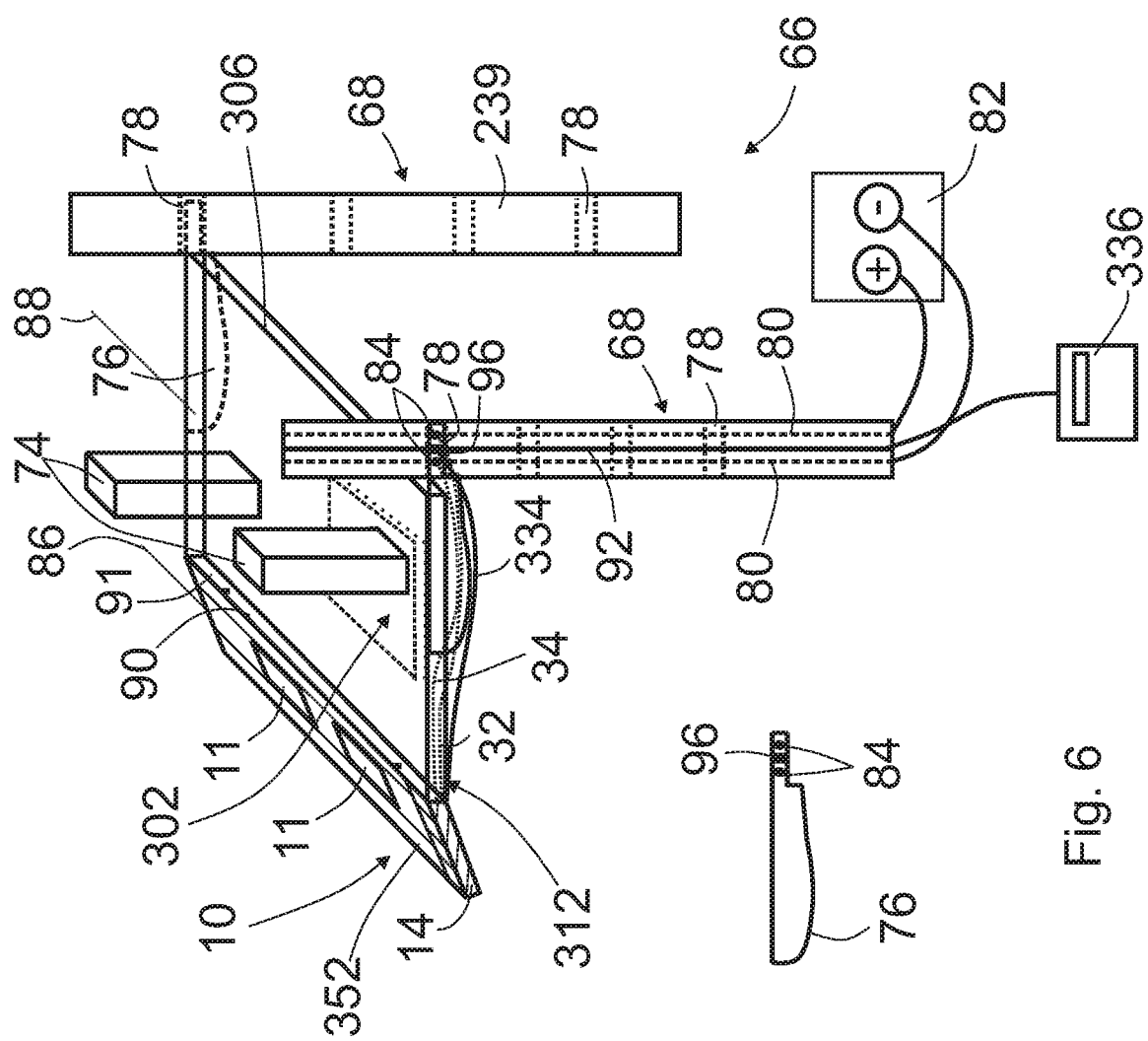

Embodiments of the invention will be explained in greater detail in the following, with reference to the accompanying drawings. In the drawings:

FIG. 1A is a schematic view of a first embodiment of a device according to the invention, FIG. 1B is a schematic three-dimensional view of a first embodiment of a system according to the invention comprising a device according to FIG. 1A, FIG. 2 is a schematic view of a power supply system, FIG. 3 is a cross section of a second embodiment of a system according to the invention, without the closure means being shown, FIG. 4 is a three-dimensional view of a closure means of the second embodiment of the system according to the invention, FIG. 5 is a schematic three-dimensional view of a first embodiment of a goods presentation system according to the invention, and FIG. 6 is a schematic three-dimensional view of a second embodiment of a goods presentation system according to the invention.

The device 300 according to FIGS. 1A and 1B comprises a flat element 302 made of a plastic material and that is intended to be arranged or placed on a shelf surface 304 of a shelf element 306 for a goods shelf 308, and a plurality of signaling devices 309 (for the sake of clarity only two signaling devices 309 are shown), which are in each case provided for signaling a weight load one region 338, respectively, of the flat element 302 from at least one goods item 305 that is arranged on the relevant region 338 of the flat element 302, wherein each region 338 is designed in the form of a longitudinal portion 338 of the elongate flat element 302. In this case, FIGS. 1A and 1B already show the situation in which the flat element 302 has been placed on the shelf surface 304 or arranged thereon.

Each signaling device 309 comprises a force sensor 310 for measuring the weight load, wherein each signaling device 309, with the exception of the relevant signal conductors 332 and power supply conductors 320 and 321 of the relevant signaling device 309, is received in the plastic material 346 of the flat element 302, such that the measuring surface 344 of each force sensor 310, to which measuring surface the weight force transmitted to the flat element 302 from at least one goods item 305 is transmitted in order to be measured, is thus also received in the plastic material 346.

The weight load of the flat element 302, which is associated with the placement or arrangement, is signaled by the relevant signaling device 309, wherein the signaling of an existing weight load is achieved by means of a signal that is emitted by the signaling device 309, which signal thus provides information about the weight load, wherein, in this embodiment, said signal 309 is a signal that is or can be generated by an electronic signal generation means (not shown) of the signaling device 309, which signal is in the form of a square-wave signal 348 and is generated by the signal generation means from the measuring signal of the force sensor 310 or is generated or formed on the basis of the measuring signal emitted by the force sensor 310. The square-wave signal 348 signals an existing weight load of the flat element 302 or of the relevant longitudinal portion 338 of the flat element, wherein the square-wave signal 348 is or can be generated by the signal generation means in the event of the measuring signal of the force sensor 310 exceeding a signal threshold value.

FIG. 1B is another highly schematic view of the system 10 according to the invention, comprising the device 300 and a shelfing device 312 for the goods shelf 308, and a power supply system 352 for supplying power to a plurality of electronic display devices 11 for displaying goods-related information. The shelfing device 312 comprises the shelf element 306 comprising a shelf surface 304 (cf. FIG. 1A) on which the flat element 302 of the device 300 can be placed. The power supply system 352 is shown only as a sketch in FIG. 1, and is illustrated in greater detail in FIG. 2.

The power supply system 352 (cf. FIG. 2) comprises an elongate base body 12 made of a plastic material and can be attached to the shelfing device 312, and at least one closure means 14. In order to attach the base body 12 to the shelfing device 312, or in order to establish a connection therebetween, the base body 12 comprises two retaining means 350 which are shown only highly schematically and which can be received in a force-fitting manner in receptacles (not shown) of the shelfing device 312.

The base body comprises a channel 16 that extends over the entire length of the base body 12 and is intended for receiving the display devices 11.

The base body 12 comprises two opposite end portions 18, wherein each of the end portions 18 comprises one of two opposite channel end portions 20 of the channel 16. The display devices 11 can be received in the channel 16.

The power supply system 352 comprises two electrical conductors 21, 22, wherein each of the electrical conductors 21, 21 comprises two electrical conductor end portions 24, 26 and an intermediate portion 29.

The intermediate portion 29 of each electrical conductor 21, 22 is arranged in the channel 16, and in each case one of the electrical conductor end portions 24, 26 of each electrical conductor 21, 22 is arranged in one of the two opposite channel end portions 20, respectively. Therefore, for example in the case of the electrical conductor 21, the electrical conductor end portion 24 is arranged in one of the two channel end portions 20, and the electrical conductor end portion 26 is arranged in the other of the two channel end portions 20.

Receiving the display devices 11 in the channel 16 means that in each case one power supply contact 28 of each display device 11 can be electrically conductively contacted with one of the electrical conductors 21, 22, respectively.

The closure means 14 comprises four electrical supply line 32, 34, 324, 326 and a signal transmission line 334. The supply lines 32, 34, 324, 326 are intended for establishing a connection to a current source 36 (FIG. 2 already shows the connected state), and the signal transmission line 334 is intended for transmitting signals of the signaling devices 309 to a signal processing means 336.

The closure means 14 can be connected to each of the two opposite end portions 18 of the base body 12.

The base body 12 comprises a further or second channel 314 which extends over the entire length of the base body 12, wherein a busbar 316 that extends over the entire length of the channel 314, and comprises two electrical busbar conductors 318, 319 extending in the longitudinal direction of the busbar 316 and a signal conductor 330 that extends in the longitudinal direction of the busbar 316, is arranged in the further channel 314.

Each signaling device 309 comprises two power supply conductors 320, 321 (cf. FIG. 1) for supplying power to the relevant signaling device 309, wherein one end portion 322, in each case, of each of the power supply conductors 320, 321 can be connected to one of the busbar conductors 318, 319, respectively (cf. the schematic sketch in FIG. 2). The further channel 314 is open towards a longitudinal side of the base body 12, such that the end portions 322 of the power supply conductors 320, 321 can be connected to the busbar conductors 318, 319 from outside the further channel 314. Furthermore, each signaling device 309 comprises a signal conductor 332 for forwarding signals of the signaling device 309. The signal conductor 332 of each of the signaling devices 309 can be connected to the signal conductor 330 of the busbar 316 (cf. the schematic sketch in FIG. 2).

Connecting the closure means 14 to an end portion 18 of the base body 12 makes it possible for one supply line end portion 38 of each of the supply lines 32, 34 to be electrically conductively contacted, in each case, with one electrical conductor end portion 24, 26, respectively, of the electrical conductor end portions 24, 26 which are arranged in the channel end portion 20 of the end portion 18 of the base body 12. Connecting the closure means 14 to the relevant end portion 18 of the base body 12 also makes it possible for one supply line end portion 328 of each of the further supply lines 324, 326 to be electrically conductively contacted, in each case, with one busbar conductor 318, 319, respectively, of the busbar 316. Furthermore, connecting the closure means 14 to the relevant end portion 18 of the base body 12 of the signal conductor 330 makes it possible for the busbar 316 to be connected to the signal transmission line 334 of the closure means 14 in a signal-transmitting manner.

In order to achieve a force-fitting connection of the closure means 14 to the relevant base body end portion 18, the closure means 14 comprises two plug-in pins 17 which can be plugged into receptacles (not shown) that are provided on the end face of the end portions 18 of the base body 12 (not shown).

The display devices 11 can be received in the channel 16, which is open or accessible at both end faces and at one longitudinal side, so as to be in the channel 16 in succession along the longitudinal axis 15 of the base body 202, or can be received in the channel 16 in a manner forming a row that extends along the longitudinal axis 15 of the base body 12, or can be received in succession. The display devices 11 can be received in the channel 16 in a force-fitting manner, from the longitudinal side, or the display devices 11 can be received in the channel 16 in a clamped manner, from the longitudinal side.

In the embodiments shown, the electrical conductors 21, 22 are arranged, or fully or entirely arranged, in the channel 16. Each electrical conductor 21, 22 is designed in the form of a straight conductor track 21, 22. Each conductor track 21, 22 is extruded onto the base body 12.

The electrical conductors 21, 22 comprise the electrical conductor end portions 24, 26 and the intermediate portions 29, wherein the relevant electrical conductor end portions 24, 26 are interconnected by the relevant intermediate portion 29. The relevant intermediate portion 29 is arranged in the channel 16, and the electrical conductor end portions 24, 26 are arranged, or fully or entirely arranged, in the relevant channel end portion 20. However, restriction to arranging or fully arranging the electrical conductor end portions 24, 26, in the channel end portions 20 is of course not intended according to the invention. It is thus possible, in an alternative embodiment, for at least one of the electrical conductor end portions 24, 26 to also be arranged for example such that a sub-portion 31 thereof is outside the channel 16 and such that a sub-portion 27 thereof is in the channel end portion 20, as is illustrated schematically in FIG. 2 for an electrical conductor end portion 26.

The base body 12 according to FIG. 3, of a third embodiment of a system 10 according to the invention, differs from the base body 12 according to FIG. 2 in particular in that the channel 16 of the extruded base body 12 is formed of three continuous sub-regions 97, 98, 99 which are rectangular in cross section. An electrical conductor 21, 22 for supplying power to the display devices is arranged, in each case, in the sub-regions 97, 98 that are smaller in each case. The second or further channel 314, in which the busbar 316 is arranged and which is open towards a longitudinal side of the extruded base body 12 or is accessible from a longitudinal side of the base body 12, advantageously has a space-savingly small channel depth.

The end portions 322 of the relevant power supply conductors 320, 321 of the relevant signaling device 309, which end portions can be connected to the busbar conductors 318, 319, are designed in this case in the form of contacts 322 of a connection element 354. Accordingly, the relevant signal conductor 332 of the relevant signaling device 309 also comprises a signal-transmitting contact element 333 for connection to the signal conductor 330 of the busbar 316, wherein the contact element 333 is provided on the connection element 354.

The base body 12 according to FIG. 3 further comprises a third channel 356, in which an elongate luminaire 358 for illuminating adjacent shelfing devices is attached and arranged. The base body 12 is designed such that it can be suspended on the shelfing device 312 of the system 10 by means of a claw-like region 360.

The closure means 14 (cf. FIG. 4) of the power supply system 352 comprising the base body 12 according to FIG. 3 comprises a flat body 40 made of a plastic material with two opposite sides 42 and 44 and a plug-in member 46 made of a plastic material and that is connected to the side 42. In order to connect the closure means 14 to an end portion 18 of the base body 12, the plug-in member 46 can be received in the channel 16 in a force-fitting manner by means of being plugged into the channel 16 by an end face. The supply line end portions 38 which can be contacted with the relevant electrical conductor end portions of the channel 16 are provided on the plug-in member 46, wherein, in this embodiment, both the upper and the lower supply line end portion 38 are in each case designed in the form of a double-contact.

The closure means 14 according to FIG. 9 further comprises a second and a third plug-in member 112, 114. The second plug-in member 112 comprises two supply line end portions 328 in the form of contacting elements 328 for supplying power to the signaling devices 309, which contacting elements can be contacted with respective busbar conductors by means of the plug-in member 112 being plugged into the channel 314. The contacting elements 328 themselves are in turn in each case electrically conductively connected to one line, respectively, which is received in a casing of a cable 117, in regions, in which cable the supply lines for supplying power to the display devices 11 and the elongate luminaire 358 are also received in regions. The second plug-in member 112 also comprises a connection means 362 of a signal transmission line, which is also received in the casing of the cable 117, in regions.

Similar also applies for the third plug-in member 114. The third plug-in member 114 comprises two connection elements 118 for supplying voltage to the elongate luminaire 358, which connection elements can be contacted with supply lines (not shown) of the elongate luminaire 358 that are arranged in the channel 356, by means of the plug-in member 112 being plugged into the channel 356. The connection elements 118 themselves are in turn in each case electrically conductively connected to one line, respectively, which is received in the casing of the cable 117, in regions. In the case of a goods presentation system according to the invention, all of the supply lines that are received in the casing of the cable 117, in regions, can be supplied with power via respective connection elements, provided on at least one retaining element, by means of the retaining element being received in the relevant receptacle of the retaining post, specifically in order to supply power to the display devices 11, the signaling devices 309 and the elongate luminaire 358.

In a visually very appealing manner, the relevant end face of the base body 12 can be covered by the flat body 40 of the closure means 14, by means of the plug-in member 46 and the plug-in members 112 and 114 being plugged into the channels 16, 314 and 356 by the end faces. The goods presentation system 66 according to FIG. 5 comprises a system 10 according to the invention, comprising the shelfing device 312, and a goods shelf 308 comprising two retaining posts 68, wherein, in alternative embodiments, a higher number of retaining posts and shelfing devices may of course also be provided.

The shelfing device 312 comprises the shelf element 306 comprising the shelf surface 304 and two retaining elements 76.

The retaining elements 76 are detachably connected to the shelf element 306, specifically by means of receptacles (not shown) on the shelf element 306, into which tabs (not shown) of the retaining elements 76 can be inserted.

Each retaining post 68 comprises four receptacles 78, wherein one of the retaining elements 76, respectively, can be received in each of the receptacles 78, in order to retain the shelfing device 70 on the retaining posts 68. In this case, FIG. 5 already illustrates the state in which the retaining elements 76 are in each case received in one of two opposite receptacles 78, wherein one receptacle 78 is positioned on one retaining post 68 and the other receptacle 78 is positioned on the other retaining post 68.

One of the two retaining posts 68 comprises at least two electrical conductors 80 which are provided for connection to a current source 82.

One of the retaining elements 76 comprises two electrical connection elements 84, wherein one of the supply lines 32, 34, 324, 326, respectively, of the closure means 14 can be electrically conductively connected to each closure means 84.

Each connection element 84 can be electrically conductively contacted with one of the conductors 80, respectively, of the retaining post 68, by means of the retaining element 76 being received in the relevant receptacle 78 of the retaining post 68.

The elongate base body 12 of the system 10 can be attached to the shelfing device 312, wherein FIG. 4 already shows the attached state. The shelfing device 306 is elongate, and the elongate base body 12 can be attached to the shelfing device 312 in an arrangement in which a surface 90 of the base body 12 that extends along the longitudinal axis 86 of the base body 12 faces a surface 91 of the shelf element 306 that extends along the longitudinal axis 88 of the shelf element 306.

The goods presentation system 66 according to FIG. 6 differs from the goods presentation system 66 according to FIG. 5 in that the retaining post 68 additionally comprises a signal line 92 which is intended for transmitting signals of the signaling device(s) 309 to a signal processing means (336). The retaining element 76 comprising the electrical connection elements 84 additionally comprises a signal line connection 96, wherein a signal transmission line 334 of the closure means 14 of the power supply system 352 can be connected to the signal line connection 96. The signal line connection 96 can be connected to the signal line 92 of the retaining post 68, in a signal-transmitting manner, by means of the retaining element 76 being received in the receptacle 78 of the retaining post 68.

LIST OF REFERENCE CHARACTERS 10 system
11 display device
12 base body
14 closure means
15 longitudinal axis
16 channel
17 plug-in pin
18 end portion
20 channel end portion
21 electrical conductor
22 electrical conductor
24 electrical conductor end portion
26 electrical conductor end portion
27 sub-portion
28 power supply contact
29 intermediate portion
31 sub-portion
32 supply line
34 supply line
36 current source
38 supply line end portion
40 flat body
42 side
44 side
46 plug-in member
66 goods presentation system
68 retaining post
74 goods
76 retaining element
78 receptacle
80 conductor
82 current source
84 connection element
86 longitudinal axis of the base body
88 longitudinal axis of the shelf element
90 surface
91 surface
92 signal line of the retaining post
96 signal line connection
97 sub-region
98 sub-region
99 sub-region
112 plug-in member
114 plug-in member
117 cable
118 connection element
300 device
302 flat element
304 shelf surface
305 goods
306 shelf element
308 goods shelf
309 signaling device
310 force sensor
312 shelfing device
314 further channel
316 busbar
318 busbar conductor
319 busbar conductor
320 power supply conductor of the signaling device
321 power supply conductor of the signaling device 322 end portion
324 supply line
326 supply line
328 supply line end portion
330 signal conductor
332 signal conductor
333 contact element
334 signal transmission line
336 signal processing means
338 region
344 measuring surface
346 plastic material
348 square-wave signal
350 retaining means
352 power supply system
354 connection element
356 third channel
358 elongate luminaire
360 claw-like region
362 connection means

The invention claimed is:

1. A system, comprising:
at least one device, comprising:
a flat element made of a plastic material and that is arranged on a shelf surface of a shelf element for a goods shelf; and
at least one signaling device for signaling a weight load of at least one region of the flat element from at least one goods item that is arranged on the flat element;
wherein the signaling device includes at least one force sensor for measuring the weight load;
at least one shelving device for a goods shelf, and a power supply system for supplying power to a plurality of electronic display devices for displaying goods-related information;
wherein the shelving device includes a shelf element including a shelf surface on which the flat element is placed;
wherein the power supply system includes an elongate base body made of a plastic material that is attached to the shelving device; and
at least one closure means;
wherein the base body includes a channel that extends over the entire length of the base body and is operable to receive the display devices;
wherein the base body includes two opposite end portions, wherein each of the end portions includes one of two opposite channel end portions of the channel;
wherein the display devices are received in the channel;
wherein the power supply system includes at least two electrical conductors;
wherein each of the electrical conductors includes two electrical conductor end portions and an intermediate portion;
wherein the intermediate portion of each electrical conductor is arranged in the channel, and in each case one of the electrical conductor end portions of each electrical conductor is arranged in one of the two opposite channel end portions, respectively, by means of at least one sub-portion;
wherein by receiving the display devices in the channel, in each case one power supply contact of each display device is electrically conductively contacted with one of the electrical conductors, respectively;
wherein the closure means includes at least two electrical supply lines which are provided for establishing a connection to a current source;
wherein the closure means is connected to at least one of the two opposite end portions of the base body;
wherein connecting the closure means to the end portion of the base body makes it possible for one supply line end portion of each of the supply lines to be electrically conductively contacted, in each case, with one electrical conductor end portion, respectively, of the electrical conductor end portions which are arranged in the channel end portion of the end portion of the base body with at least one sub-portion.

2. The system according to claim 1, wherein the base body includes a second channel which extends over the entire length of the base body, wherein a busbar that includes at least two electrical busbar conductors extending in the longitudinal direction of the busbar is arranged in a portion of the second channel, wherein the signaling device includes at least two power supply conductors for supplying power to the signaling device, wherein one end portion, in each case, of each of the power supply conductors is connected to one of the busbar conductors, respectively, wherein the second channel is open towards a longitudinal side of the base body, such that the end portions of the power supply conductors are connected to the busbar conductors from outside the second channel;
wherein the closure means includes at least two further electrical supply lines, wherein connecting the closure means to the end portion of the base body makes it possible for one supply line end portion of each of the further supply lines to be electrically conductively contacted, in each case, with one busbar conductor, respectively, of the busbar.

3. The system according to claim 2, wherein the busbar includes at least one signal conductor which extends in the longitudinal direction of the busbar and is operable to forward signals, wherein the signaling device includes at least one signal conductor for forwarding signals of the signaling device, wherein the signal conductor of the signaling device is connected to the signal conductor of the busbar, wherein the closure means includes at least one signal transmission line that is operable to transmit signals of the signaling device to a signal processing means, wherein connecting the closure means to the end portion of the base body of the signal conductor enables the busbar to be connected to the signal transmission line of the closure means in a signal-transmitting manner.

4. A goods presentation system, comprising:
a system according to claim 3; and
at least one goods shelf including at least two retaining posts;
wherein the base body of the power supply system is operable to be attached to the shelving device;
wherein the shelving device includes the shelf element includes the shelf surface and two retaining elements;
wherein the retaining elements are connected to the shelf element;
wherein each retaining post includes at least one receptacle in which one of the retaining elements is received, in each case, for retaining the shelving device on the retaining posts;
wherein at least one of the retaining posts includes at least two electrical conductors which are provided for connection to a current source;
wherein at least one of the retaining elements includes at least two electrical connection elements, wherein one of the supply lines, respectively, of the closure means is connected to each closure means;

wherein each connection element is electrically conductively contacted with one of the conductors, respectively, of the retaining post, by means of the retaining element being received in the receptacle of the retaining post.

5. The goods presentation system according to claim 4, wherein the shelving device is elongate, wherein the elongate base body is attached to the shelving device in an arrangement in which a surface of the base body that extends along a longitudinal axis of the base body faces a surface of the shelf element that extends along a longitudinal axis of the shelf element.

6. The goods presentation system according to claim 5, wherein at least one of the retaining posts includes:
   at least one signal line that is operable to transmit signals of the signaling device to a signal processing means;
   wherein at least one of the retaining elements includes at least one signal line connection, wherein the signal transmission line of the closure means is connected to the signal line connection;
   wherein the signal line connection is connected to the signal line of the retaining post, in a signal-transmitting manner, by means of the retaining element being received in the receptacle of the retaining post.

7. The goods presentation system according to claim 6, wherein the retaining elements are detachably connected to the shelf element.

\* \* \* \* \*